(12) United States Patent
Lai et al.

(10) Patent No.: US 8,797,698 B2
(45) Date of Patent: Aug. 5, 2014

(54) ELECTROSTATIC DISCHARGE (ESD) PROTECTION AND OPERATING METHOD THEREOF

(71) Applicants: Da-Wei Lai, Hsinchu (TW); Wade Ma, Hsinchu (TW)

(72) Inventors: Da-Wei Lai, Hsinchu (TW); Wade Ma, Hsinchu (TW)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 0 days.

(21) Appl. No.: 13/770,544

(22) Filed: Feb. 19, 2013

(65) Prior Publication Data

US 2013/0163129 A1    Jun. 27, 2013

Related U.S. Application Data

(63) Continuation of application No. 12/824,571, filed on Jun. 28, 2010, now Pat. No. 8,400,742.

(60) Provisional application No. 61/221,854, filed on Jun. 30, 2009.

(51) Int. Cl.
*H02H 9/00* (2006.01)

(52) U.S. Cl.
USPC ............................................. 361/56

(58) Field of Classification Search
CPC ..................................... H02H 9/046
USPC ............................... 361/56, 91.1, 111
See application file for complete search history.

(56) References Cited

U.S. PATENT DOCUMENTS

| | | | |
|---|---|---|---|
| 6,801,416 B2* | 10/2004 | Hatzilambrou et al. | ........ 361/56 |
| 6,985,002 B2 | 1/2006 | Salcedo | |
| 7,379,283 B1* | 5/2008 | Farrenkopf et al. | ......... 361/91.3 |
| 7,518,845 B2 | 4/2009 | Gauthier, Jr. et al. | |
| 7,760,476 B2 | 7/2010 | Riviere et al. | |
| 7,965,481 B2 | 6/2011 | Huang et al. | |
| 2009/0040671 A1 | 2/2009 | Zhang | |
| 2010/0027173 A1 | 2/2010 | Wijmeersch | |

OTHER PUBLICATIONS

Quittard, Olivier et al., "ESD Protection for High-Voltage CMOS Technologies", EOS/ESD Symposium Jun. 1977, pp. 2A.4-1-2A.4-10.
Ker, Ming-Dou, et al., "Whole-Chip ESD Protection Design for Submicron CMOS VLSI", 1997 IEEE International Symposium on Circuits and Systems, Jun. 9-12, 1997, Hong Kong, pp. 1920-1923.

* cited by examiner

*Primary Examiner* — Rexford Barnie
*Assistant Examiner* — Tien Mai
(74) *Attorney, Agent, or Firm* — Lowe Hauptman & Ham, LLP

(57) ABSTRACT

An electrostatic discharge (ESD) protection circuit includes a clamp transistor, and inverter, a resistance-capacitance (RC) circuit, and a current mirror. The clamp transistor is coupled between a first supply node and a second supply node. The inverter has an input end and an output end, and the output end of the inverter is coupled with a gate of the clamp transistor. The RC circuit is coupled to the first supply node. The current mirror includes a first transistor and a second transistor. The first transistor is coupled between the input end of the inverter and the second supply node, and the second transistor is coupled between the RC circuit and the second supply node.

20 Claims, 3 Drawing Sheets

ELECTROSTATIC DISCHARGE (ESD) PROTECTION AND OPERATING METHOD THEREOF

CROSS-REFERENCE TO RELATED APPLICATIONS

The present application is a continuation of U.S. application Ser. No. 12/824,571, filed Jun. 28, 2010, which claims the priority of U.S. Provisional Application No. 61/221,854 filed Jun. 30, 2009, which are incorporated herein by reference in their entireties.

TECHNICAL FIELD

The present disclosure relates generally to the field of semiconductor circuits, and more particularly, to electrostatic discharge (ESD) protection circuits, integrated circuits, systems, and methods for forming the integrated circuits.

BACKGROUND

ESD protection mechanisms generally work in two ways. First, by dissipating the ESD current transient safely using a low-impedance discharging channel that prevents thermal damage in the structures of the integrated circuit. Secondly, by clamping any ESD induced voltage to a safe level to avoid dielectric degradation or rupture. Ideally the complete ESD protection solution should be realized on the integrated circuit (IC) creating an effective discharging channel from any pin to every other pin on the integrated circuit.

Devices that are used as ESD protection elements include diodes, bipolar transistors, metal-oxide-semiconductor field effect transistors (MOSFETs), and silicon-controlled rectifiers (SCRs). SCRs function as switches that can be configured to turn on and shunt voltage from the input/output (I/O) pads of an integrated circuit to ground.

In ESD protection some integrated circuit elements may be vulnerable by discharges occurring within automated equipment, while others may be more prone to damage from handling by personnel. This can occur from direct transfer of electrostatic charge from the human body or from a charged material to the electrostatic discharge sensitive (ESDS) element. When one walks across a floor, an electrostatic charge accumulates on the body. Simple contact of a finger to the leads of an ESDS device or assembly allows the body to discharge, possibly causing device damage. The model used to simulate this event is the Human Body Model (HBM).

The HBM testing model represents the discharge from the fingertip of a standing individual delivered to the device. It is modeled by a 100 pF capacitor discharged through a switching component and a 1.5 kOhm series resistor into the component. Typically, integrated circuit designers would like to see protection from the HBM testing to be greater than 2,000 volts.

An electrostatic discharge can also occur from a charged conductive object, such as a metallic tool or fixture. To test for this, designers use the Machine Model (MM). The machine model consists of a 200 pF capacitor discharged directly into a circuit without a series resistor. Typically, integrated circuit designers would like to see protection from the machine model to be greater than 200 volts.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the numbers and dimensions of the various features may be arbitrarily increased or reduced for clarity of discussion.

DETAILED DESCRIPTION

Figure 1:
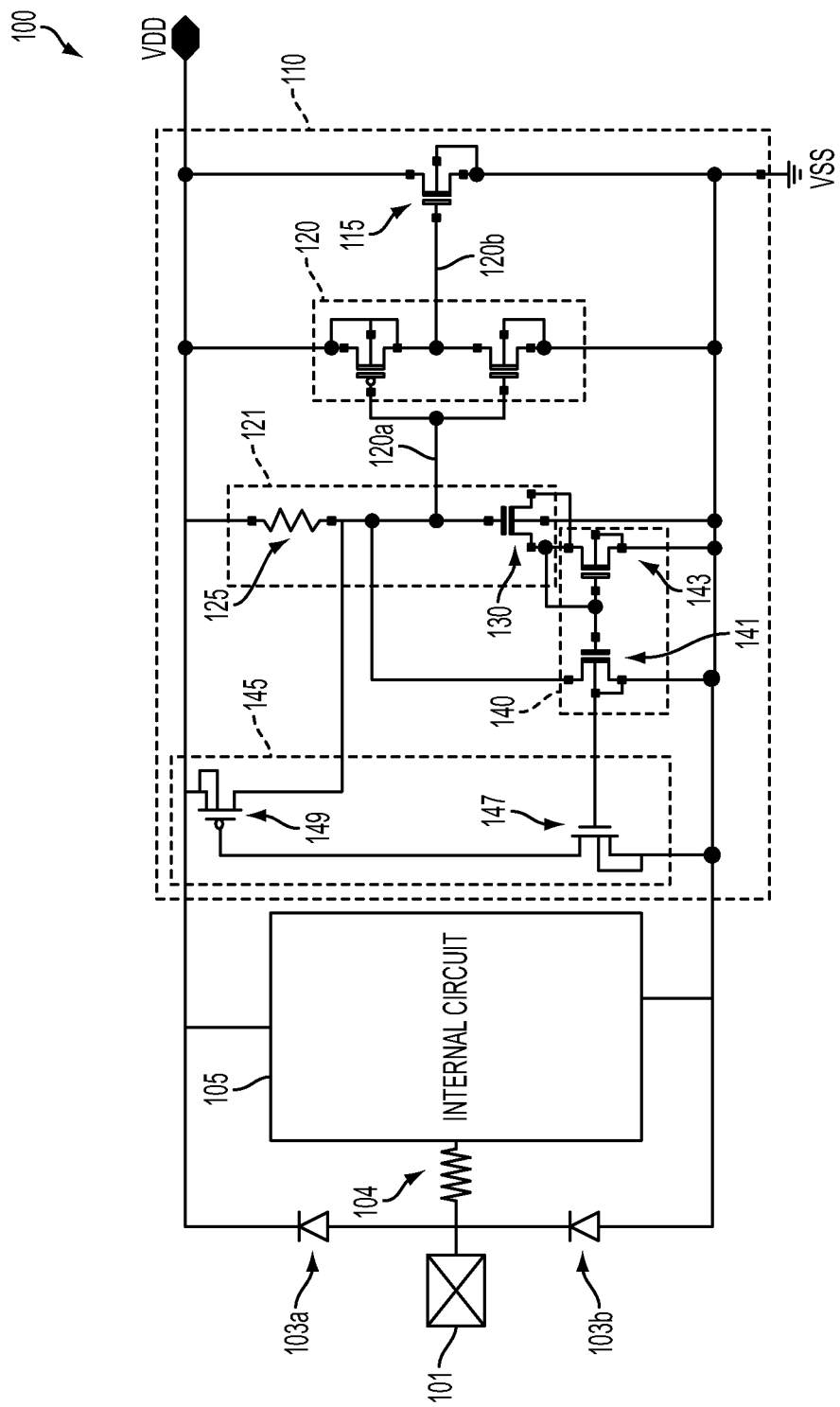
FIG. 1 is a schematic drawing illustrating an exemplary integrated circuit including an ESD protection circuit.

A conventional ESD protection circuit has a clamp field effect transistor (FET). The conventional ESD protection circuit also has a resistor coupled with a capacitor. While an ESD pulse occurs at an I/O pad of a circuit, the resistor and the capacitor can provide a RC time constant, e.g., about 2 µs, for keeping or maintaining the clamp FET on so as to discharge the ESD pulse to a ground. It is found that the resistance of the resistor and the capacitance of the capacitor should be large enough to provide the desired RC time constant. The resistor and the capacitor would consume a large area of the circuit.

To reduce the area of the capacitor, a current mirror has been proposed to be disposed within the conventional ESD protection circuit. The current mirror with a current amplification can be used to amplify the capacitance of the capacitor. Since the capacitance of the capacitor can be amplified, the area of the capacitor can be reduced to achieve the same capacitance. Accordingly, the resistor and the capacitor that are coupled with the current mirror can have an area smaller than that of the resistor and capacitor without the current mirror.

However, it is found that while the integrated circuit is subjected to a latch-up test using a negative current, the clamp FET is turned on. The turned-on clamp FET allows a large current flowing between the source and the drain of the clamp FET. The current flow can result in an electrical overstress (EOS) failure to the clamp FET.

Based on the foregoing, integrated circuits that are capable of substantially eliminating the EOS failure while the integrated circuit is subjected to the latch-up test using a negative current, systems, and operating methods thereof are desired.

It is understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "lower," "upper," "horizontal," "vertical," "above," "below," "up," "down," "top," "bottom," etc. as well as derivatives thereof (e.g., "horizontally," "downwardly," "upwardly," etc.) are used for ease of the present disclosure of one features relationship to another feature. The spatially relative terms are intended to cover different orientations of the device including the features.

FIG. 1 is a schematic drawing illustrating an exemplary integrated circuit including an electrostatic discharge (ESD) protection circuit. An integrated circuit 100 can include an input/output (I/O) pad 101. The I/O pad 101 can be coupled with an ESD protection circuit 110. In various embodiments, the I/O pad 101 can be coupled with the ESD protection circuit 110 through at least one diode, e.g., diodes 103a and 103b. The I/O pad 101 can be coupled with an internal circuit 105. In various embodiments, a resistor 104 can be disposed between the internal circuit 105 and the I/O pad 101 for protecting the internal circuit 105 from being damaged by an ESD pulse. The internal circuit 105 can include, for example, static random access memory (SRAM) array, an embedded SRAM array, dynamic random access memory (DRAM) array, an embedded DRAM array, a field-programmable gate array, a non-volatile memory, e.g., FLASH, EPROM, $E^2$PROME, a logic circuit, an analog circuit, any other kind of integrated circuits, and/or any combinations thereof.

Referring to FIG. 1, the ESD protection circuit 110 can include a clamp field effect transistor (FET) 115. The clamp FET 115 can be disposed between a first supply voltage, e.g., a supply voltage VDD, and a second supply voltage, e.g., a supply voltage VSS. The supply voltage VDD can be a voltage provided for operations of the internal circuit 105. In various embodiments, the VDD can be 1.5 V, 1.8 V, 2.5 V, 3.3 V, 5 V, 9 V, 12 V, or any other voltage that is desired for the operations of the internal circuit 105. The supply voltage VSS can be a ground provided by a ground terminal coupled with the internal circuit 105. In various embodiments, the ground that is capable of providing the supply voltage VSS can be referred to as a core ground.

The ESD protection circuit 110 can include an inverter 120. The inverter 120 can have an input end 120a and an output end 120b. The output end 120b of the inverter 120 can be coupled with a gate of the clamp FET 115. In various embodiments, the inverter 120 can include a PMOS transistor and an NMOS transistor. The source end of the PMOS transistor can be coupled with the supply voltage VDD. The drain end of the PMOS transistor can be coupled with the output end 120b of the inverter 120. The source end of the NMOS transistor can be coupled with the supply voltage VSS. The drain end of the NMOS transistor can be coupled with the output end 120b of the inverter 120.

The ESD protection circuit 110 can include a resistance-capacitance (RC) time constant circuit 121. The RC time constant circuit 121 can be coupled between the supply voltages VDD and VSS. The RC time constant circuit 121 can provide a RC time constant to keep or maintain the voltage state on the input end 120a of the inverter 120 low for a desired time period. The low voltage state on the input end 120a of the inverter 120 can output a high voltage state on the gate of the clamp FET 115, turning on the clamp FET 115. If an ESD pulse occurs on the I/O pad 101, the turned-on clamp FET 115 can discharge the ESD pulse to the supply voltage VSS or the core ground.

In various embodiments, the RC time constant circuit 121 can include a resistor 125 coupled with a capacitor 130. The resistor 125 can be disposed between the supply voltage VDD and the input end 120a of the inverter 120. The capacitor 130 can be disposed between the supply voltage VSS and the input end 120a of the inverter 120.

Referring to FIG. 1, the ESD protection circuit 110 can include a current mirror 140. The current mirror 140 can be coupled between the input end 120a of the inverter 120 and the supply voltage VSS. In various embodiments, the current mirror 140 can include a transistor 141 and a transistor 143. The transistor 141 can be coupled between the input end 120a of the inverter 120 and the supply voltage VSS. The transistor 143 can be coupled between the capacitor 130 and the supply voltage VSS.

The ESD protection circuit 110 can include a circuit 145. The circuit 145 can be coupled with the input end 120a of the inverter 120. The circuit 145 can output a voltage state on the input end 120a of the inverter 120 that is capable of substantially turning on the clamp FET 115 while the I/O pad 101 is subjected to a latch-up test using a negative current.

During a normal operation without an ESD pulse, the supply voltage VDD can be coupled to the RC time constant circuit 121. Since no substantial current flows to or from the capacitor 130, the voltage state on the input end 120a of the inverter 120 is high. The inverter 120 can in turn output a low voltage state on the gate of the clamp FET 115, turning off the clamp FET 115. Since the clamp FET 115 is turned off, the supply voltage VDD can be desirably supplied to the internal circuit 105 for operations.

If an ESD pulse occurs on the I/O pad 101, the ESD pulse can be coupled to the RC time constant circuit 121, triggering a substantial current flowing to or from the capacitor 130. The current flowing to or from the capacitor 130 can pull down the voltage state on the input end 120a of the inverter 120, which in turn outputs a high voltage state on the gate of the clamp FET 115. The turned-on clamp FET 115 can desirably discharge the ESD pulse to the supply voltage VSS. Since the ESD pulse is discharged, the internal circuit 105 can be desirably protected from being damaged by the ESD pulse.

As noted, the current flows to or from the capacitor 130 while the ESD pulse occurs on the I/O pad 101. The current mirror 140 with a current amplification can amplify the capacitance of the capacitor 130. The amplified capacitance of the capacitor 130 and the resistance of the resistor 125 can provide a desired RC time constant to keep or maintain the voltage state of the input end 120a of the inverter 120 low for a desired period, e.g., 2 microsecond (μs), such that the clamp FET 115 can be turned on to desirably discharge the ESD pulse.

As noted, the current mirror 140 can include the transistor 141. The transistor 141 can include a source, a bulk, and a drain. The bulk can be a doped region, e.g., a well, or a semiconductor substrate. It is found that while the I/O pad 101 is subjected to a latch-up test using a negative current, a parasitic transistor, e.g., an npn transistor, constituted from the drain-bulk-source of the transistor 141 can be activated. The voltage state on the bulk of the transistor 141 can be pulled up to high. The activated parasitic npn transistor of the transistor 141 can couple the input end 120a of the inverter 120 to the supply voltage VSS, pulling down the voltage state on the input end 120a. The low voltage state on the input end 120a of the inverter 120 can output a high voltage state that can turn on the clamp FET 115. During the latch-up test, the turned-on clamp FET 115 can allow substantial currents flowing between the source end and drain end of the clamp FET 115. The current flow between the source end and drain end of the clamp FET 115 may result in the clamp FET 115 failing.

To substantially eliminate the issue described above, the circuit 145 can provide or output a high voltage state on the input end 120a of the inverter 120 while the I/O pad 101 is subjected to a latch-up test using a negative current. The high voltage state on the input end 120a of the inverter 120 can output a low voltage state on the gate of the clamp FET 115 for substantially turning off the clamp FET 115, such that no substantial current would flow between the source end and drain end of the clamp FET 115. While I/O pad 101 is subjected to a latch-up test using a negative current, the failure of the clamp FET 115 described above can be desirably eliminated.

In various embodiments, the circuit 145 can include a transistor 147, e.g., an NMOS transistor, and a transistor 149, e.g., a PMOS transistor. A source end of the transistor 147 can be coupled with the supply voltage VSS. A gate of the transistor 147 can be coupled with the bulk of the transistor 141 of the current mirror 140. A gate of the transistor 149 can be coupled with the transistor 147. A drain end of the transistor 149 can be coupled with the input end 120a of the inverter 120. A source end of the transistor 149 can be coupled with the supply voltage VDD.

As noted, the parasitic npn transistor of the transistor 141 can be activated while the I/O pad 101 is subjected to the latch-up test using the negative current. It is found that a parasitic npn transistor of the transistor 147 can also be activated, coupling the supply voltage VSS with the gate of the transistor 149 and turning on the transistor 149. The turned-on transistor 149 can couple the voltage supply VDD with the input end 120a of the inverter 120, pulling up the voltage state on the input end 120a of the inverter 120. The high voltage state on the input end 120a of the inverter 120 can output a low voltage state on the gate of the clamp FET 115, turning off the clamp FET. From the foregoing, while the I/O pad 101 is subjected to the latch-up test using the negative current, no substantial current flows between the source end and drain end of the clamp FET 115.

In various embodiments, the impedance of the transistor 149 can be lower than the impedance of the transistor 141. For example, the transistors 141 and 149 may have the same channel length. The transistor 149 may have a channel width larger than that of the transistor 141.

It is noted that the structure of the circuit 145 described above in conjunction with FIG. 1 is merely exemplary. In various embodiments, the circuit 145 can include a single transistor or a diode. For example, the circuit 145 can include a single PMOS transistor. The gate of the PMOS transistor can be coupled with the drain end of the transistor 141. The drain of the PMOS transistor can be coupled with the input end 120a. The source of the PMOS transistor can be coupled with the supply voltage VDD. In other embodiments, the circuit 145 can include other resistors, diodes, transistors, capacitors, and/or any other electronic components in addition to the transistors 147 and 149. One of skill in the art can modify the structure of the circuit 145 to achieve a desired circuit.

Figure 2:
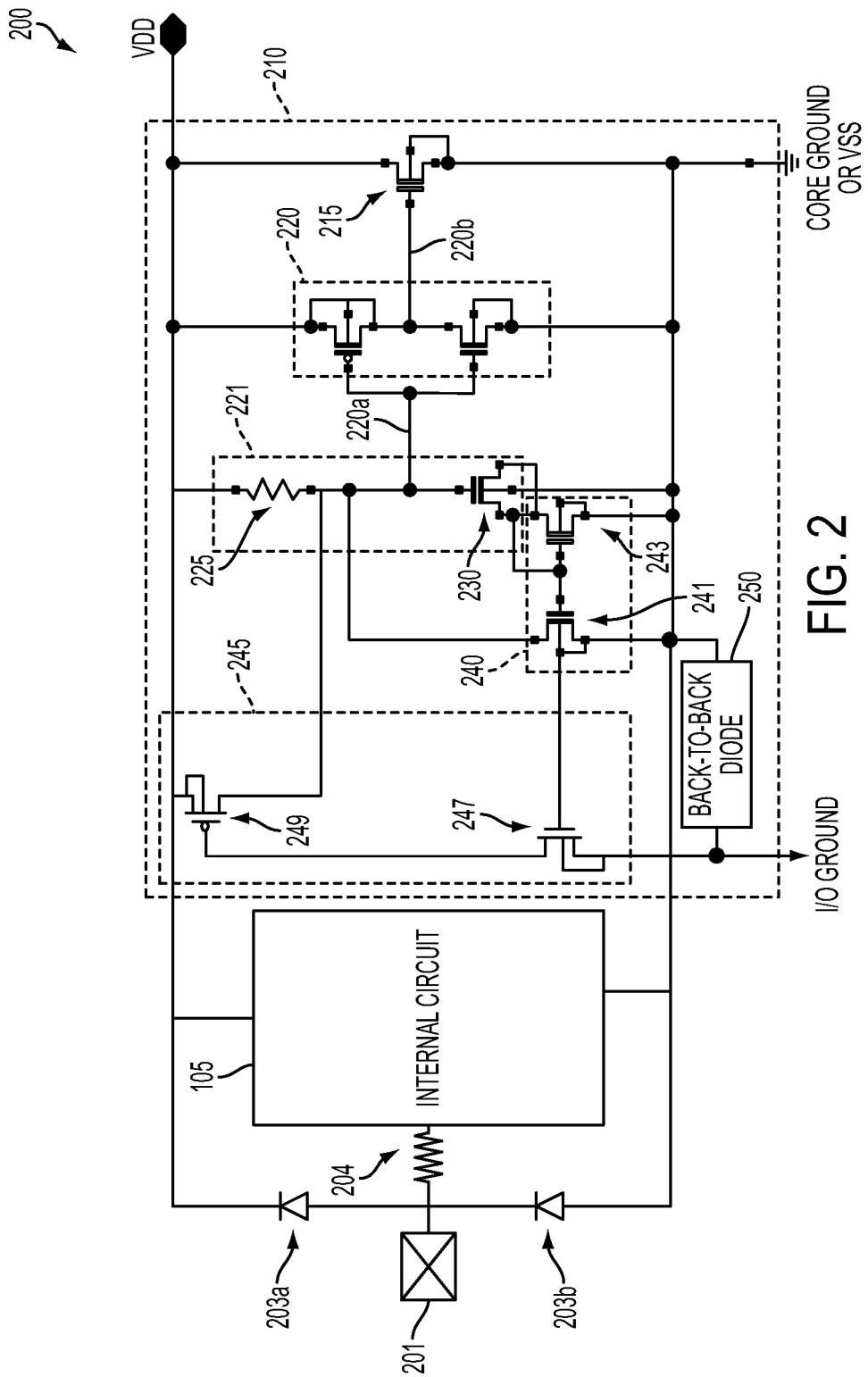
FIG. 2 is a schematic drawing illustrating another exemplary integrated circuit including an ESD protection circuit.

FIG. 2 is a schematic drawing illustrating another exemplary integrated circuit including an ESD protection circuit. Items of an integrated circuit 200 in FIG. 2 that are the same items of the integrated circuit 100 in FIG. 1 are indicated by the same reference numerals, increased by 100. In FIG. 2, the source end of the transistor 247 can be coupled with a supply voltage. The supply voltage can be a ground provided by a ground terminal. In various embodiments, the ground can be referred to as an I/O ground.

As noted, the parasitic npn transistor of the transistor 241 can be activated while the I/O pad 201 is subjected to the latch-up test using the negative current. The voltage state on the bulk of the transistor 241 can be pulled up to high. Since high voltage state on the bulk of the transistor 241 can be coupled to the gate of the transistor 247, the transistor 247 can be turned on. The turned-on transistor 247 can couple the gate of the transistor 249 with the I/O ground, pulling down the voltage state on the gate of the transistor 249 and turning on the transistor 249. The turned-on transistor 249 can couple the voltage supply VDD with the input end 220a of the inverter 220, pulling up the voltage state on the input end 220a. The high voltage state on the input end 220a of the inverter 220 can output a low voltage state on the gate of the clamp FET 215, turning off the clamp FET 215. From the foregoing, while the I/O pad 201 is subjected to the latch-up test using the negative current, no substantial current flows between the source end and drain end of the clamp FET 215.

In various embodiments, the integrated circuit 200 can include a back-to-back diode 250. The back-to-back diode 250 can be disposed between the I/O ground and the core ground. The back-to-back diode 250 can desirably isolate the I/O ground from the core ground. In various embodiments, the back-to-back diode 250 can be an n/p diode coupled with a p/n diode in series.

Figure 3:
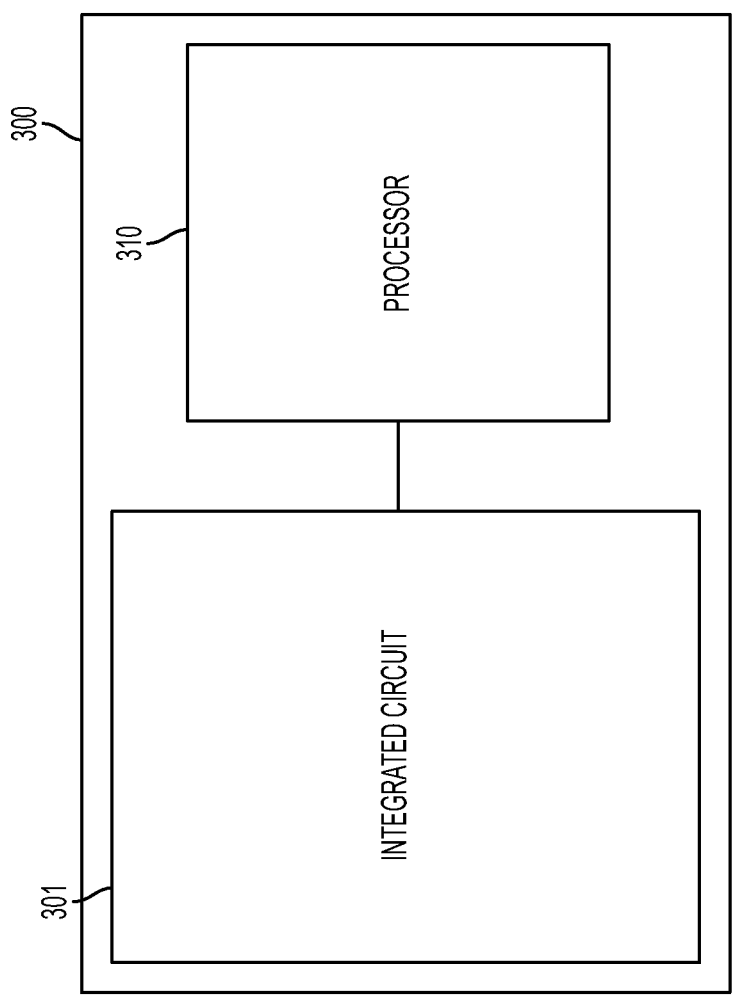
FIG. 3 is a schematic drawing showing a system including an exemplary integrated circuit.

FIG. 3 is a schematic drawing showing a system including an exemplary integrated circuit. In FIG. 3, a system 300 can include a processor 310 coupled with an integrated circuit 301. The integrated circuit 301 can be similar to the integrated circuits 100 and 200 described above in conjunction with FIGS. 1 and 2. In various embodiments, the processor 310 can be a processing unit, central processing unit, digital signal processor, or other processor that is suitable for accessing data of a memory circuit.

In various embodiments, the processor 310 and the integrated circuit 301 can be formed within a system that can be physically and electrically coupled with a printed wiring board or printed circuit board (PCB) to form an electronic assembly. The electronic assembly can be part of an electronic system such as computers, wireless communication devices, computer-related peripherals, entertainment devices, or the like.

In various embodiments, the system 300 including the integrated circuit 301 can provides an entire system in one IC, so-called system on a chip (SOC) or system on integrated circuit (SOIC) devices. These SOC devices may provide, for example, all of the circuitry needed to implement a cell phone, personal data assistant (PDA), digital VCR, digital camcorder, digital camera, MP3 player, or the like in a single integrated circuit.

In accordance with an embodiment, an electrostatic discharge (ESD) protection circuit includes a clamp transistor, and inverter, a resistance-capacitance (RC) circuit, and a current mirror. The clamp transistor is coupled between a first supply node and a second supply node. The inverter has an input end and an output end, and the output end of the inverter is coupled with a gate of the clamp transistor. The RC circuit is coupled to the first supply node. The current mirror includes a first transistor and a second transistor. The first transistor is coupled between the input end of the inverter and the second supply node, and the second transistor is coupled between the RC circuit and the second supply node.

In accordance with another embodiment, an electrostatic discharge (ESD) protection circuit includes an internal node, a clamp transistor, a resistive device, a capacitive device, and a current mirror. The clamp transistor is coupled between a first supply node and a second supply node, and the clamp transistor is configured to be turned on or off responsive to a voltage stage at the internal node. The resistive device is coupled between the first supply node and the internal node. The capacitive device has a first end and a second end, and a first end of the capacitive device coupled to the internal node. The current mirror includes a first transistor and a second transistor. The first transistor is coupled between the internal node and the second supply node, and the second transistor is coupled between the second end of the capacitive device and the second supply node.

In accordance with another embodiment, a method of operating an ESD protection circuit, coupled between a first supply node and a second supply node, includes activating a first parasitic transistor of a first transistor of a current mirror of the ESD protection circuit for coupling an input end of an inverter to the second supply node. An output end of the inverter is coupled to a clamp transistor, and the clamp transistor is coupled between the first supply node and the second supply node. A voltage state is provided on the input end of the inverter that is capable of substantially turning off the clamp transistor responsive to a latch-up event.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electrostatic discharge (ESD) protection circuit, comprising:
    a clamp transistor coupled between a first supply node and a second supply node;
    an inverter having an input end and an output end, the output end of the inverter being coupled with a gate of the clamp transistor;
    a resistance-capacitance (RC) circuit coupled to the first supply node, the RC circuit comprising a capacitive device; and
    a current mirror including a first transistor and a second transistor, the first transistor being coupled between the input end of the inverter and the second supply node, the second transistor being coupled between the RC circuit and the second supply node, and the capacitive device of the RC circuit being coupled between the input end of the inverter and the second transistor.

2. The ESD protection circuit of claim 1, wherein the RC circuit further comprises:
    a resistive device having a first end coupled to the input end of the inverter,
    wherein the capacitive device has a first end coupled to the resistive device and the input end of the inverter.

3. The ESD protection circuit of claim 1, further comprising a circuit coupled with the input end of the inverter, the circuit being configured to output a voltage state on the input end of the inverter that is capable of substantially turning off the clamp transistor responsive to a latch-up event.

4. The ESD protection circuit of claim 3, wherein the circuit comprises:
    a third transistor, a source end of the third transistor being coupled with the second supply node, a gate of the third transistor being coupled with a bulk of the first transistor of the current mirror; and
    a fourth transistor coupled between the first supply node and the input end of the inverter, a gate of the fourth transistor being coupled with a drain end of the third transistor.

5. The ESD protection circuit of claim 4, wherein the third transistor is configured to form a parasitic path for coupling the gate of the fourth transistor with the second supply node responsive to a latch-up event.

6. The ESD protection circuit of claim 4, wherein an impedance of the fourth transistor is lower than an impedance of the first transistor.

7. The ESD protection circuit of claim 4, wherein the fourth transistor is a P-type transistor.

8. The ESD protection circuit of claim 3, wherein the circuit comprises:
    a third transistor, a source end of the third transistor being coupled with a third supply node, a gate of the third transistor being coupled with a bulk of the first transistor of the current mirror; and
    a fourth transistor coupled between the first supply node and the input end of the inverter, a gate of the fourth transistor being coupled with a drain end of the third transistor.

9. The ESD protection circuit of claim 8, further comprising a back-to-back diode device coupling the second supply node and the third supply node.

10. The ESD protection circuit of claim 8, wherein the third transistor is configured to form a parasitic path for coupling the gate of the fourth transistor with the third supply node responsive to a latch-up event.

11. The ESD protection circuit of claim 8, wherein an impedance of the fourth transistor is lower than an impedance of the first transistor.

12. The ESD protection circuit of claim 8, wherein the fourth transistor is a P-type transistor.

13. An electrostatic discharge (ESD) protection circuit, comprising:
    an internal node;
    a clamp transistor coupled between a first supply node and a second supply node, the clamp transistor being configured to be turned on or off responsive to a voltage stage at the internal node;
    a resistive device coupled between the first supply node and the internal node;
    a capacitive device having a first end and a second end, the first end of the capacitive device coupled to the internal node; and
    a current mirror comprising a first transistor and a second transistor, the first transistor being coupled between the internal node and the second supply node, and the second transistor being coupled between the second end of the capacitive device and the second supply node.

14. The ESD protection circuit of claim 13, further comprising:
    a third transistor, a source end of the third transistor being coupled with the second supply node, a gate of the third transistor being coupled with a bulk of the first transistor of the current mirror; and
    a fourth transistor coupled between the first supply node and the internal node, a gate of the fourth transistor being coupled with a drain end of the third transistor.

15. The ESD protection circuit of claim 13, further comprising:
    a third transistor, a source end of the third transistor being coupled with a third supply node, a gate of the third transistor being coupled with a bulk of the first transistor of the current mirror; and
    a fourth transistor coupled between the first supply node and the internal node, a gate of the fourth transistor being coupled with a drain end of the third transistor.

16. The ESD protection circuit of claim 15, further comprising a back-to-back diode device coupling the second supply node and the third supply node.

17. A method of operating an ESD protection circuit, the ESD protection circuit being coupled between a first supply node and a second supply node, the method comprising:
- activating a first parasitic transistor of a first transistor of a current mirror of the ESD protection circuit for coupling an input end of an inverter to the second supply node, an output end of the inverter being coupled to a clamp transistor, and the clamp transistor being coupled between the first supply node and the second supply node; and
- providing a voltage state on the input end of the inverter that is capable of substantially turning off the clamp transistor based on a resistance-capacitance (RC) circuit coupled between the first supply node and a second transistor of the current mirror, the RC circuit comprising a capacitive device, and the capacitive device of the RC circuit being coupled between the input end of the inverter and the second transistor.

18. The method of claim 17, wherein providing the voltage state on the input end of the inverter comprises:
- turning on the second transistor for coupling the input end of the inverter with the first supply node.

19. The method of claim 18, wherein the providing the voltage state on the input end of the inverter further comprises:
- activating a second parasitic transistor of a third transistor responsive to a latch-up event, a gate of the third transistor being coupled with a bulk of the first transistor; and
- coupling a gate of the second transistor with the second supply node.

20. The method of claim 18, wherein the providing the voltage state on the input end of the inverter further comprises:
- activating a second parasitic transistor of a third transistor responsive to a latch-up event, a gate of the third transistor being coupled with a bulk of the first transistor; and
- coupling a gate of the second transistor with a third supply node, the second supply node being coupled with the third supply node through a back-to-back diode device.

* * * * *